United States Patent [19]

Zaltsberg

[11] Patent Number: 4,471,526

[45] Date of Patent: Sep. 18, 1984

[54] INSTALLATION TOOL

[75] Inventor: Leib Zaltsberg, Chicago, Ill.

[73] Assignee: Stability, Inc., River Forest, Ill.

[21] Appl. No.: 412,026

[22] Filed: Aug. 26, 1982

[51] Int. Cl.³ .......................................... H01B 13/22
[52] U.S. Cl. ..................................... 29/745; 29/235; 29/267; 29/280; 29/758
[58] Field of Search ................ 29/745, 758, 235, 267, 29/280, 278

[56] References Cited

U.S. PATENT DOCUMENTS 3,307,249 3/1967 Hohoff ................................. 29/235
3,737,968 6/1973 Bender ................................ 29/267

Primary Examiner—Carl E. Hall
Attorney, Agent, or Firm—Marshall, O'Toole, Gerstein, Murray & Bicknell

[57] ABSTRACT

A tool for installing on an aerial power transmission line, a vibration damper having a resilient split sleeve and a fin. The vibration damper installation tool comprises a frame element for fitting around the aerial conductor, a conductor guide, a fin receiver for engaging the fin of the vibration damper, and structure on the conductor guide and fin receiver for the application of force to clamp the resilient split sleeve of the vibration damper onto the conductor.

19 Claims, 9 Drawing Figures

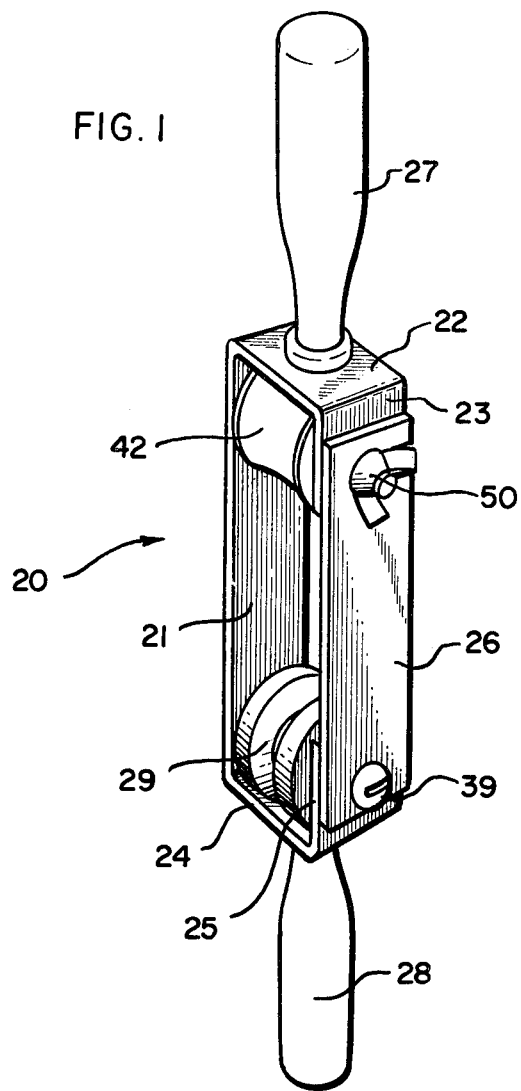
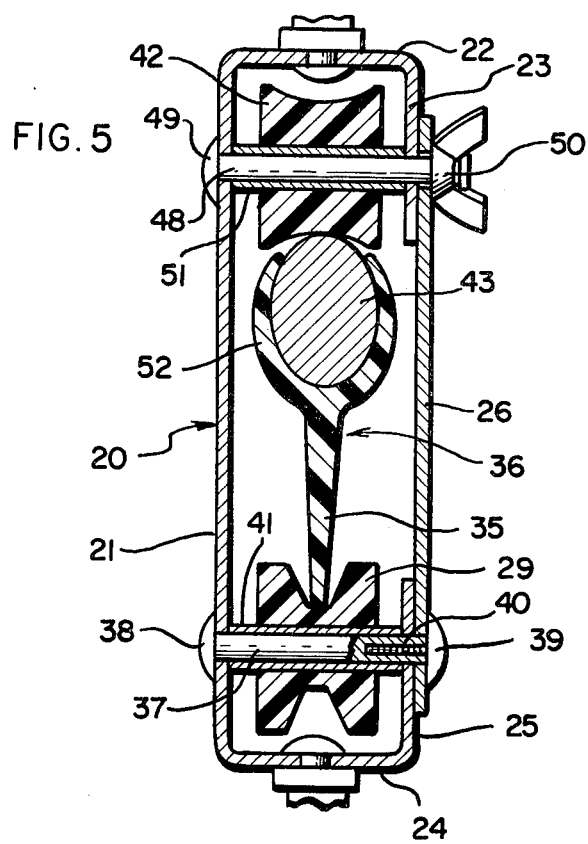
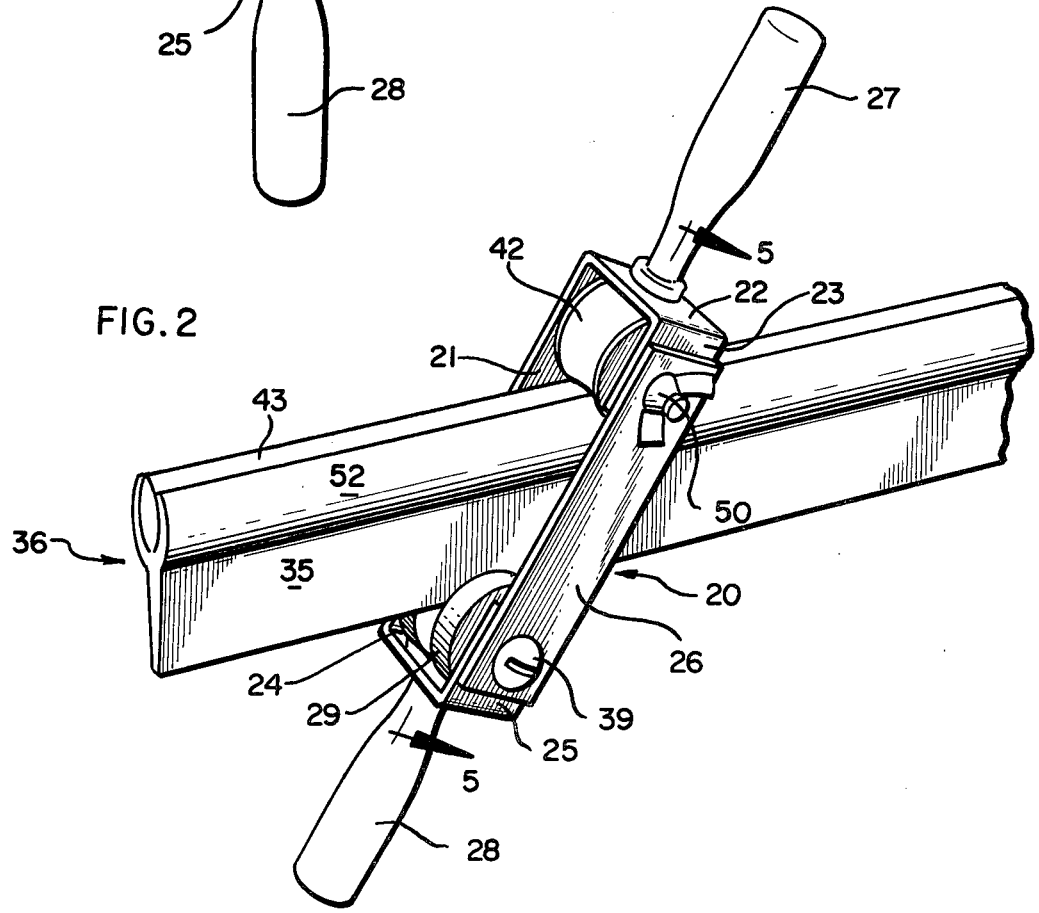

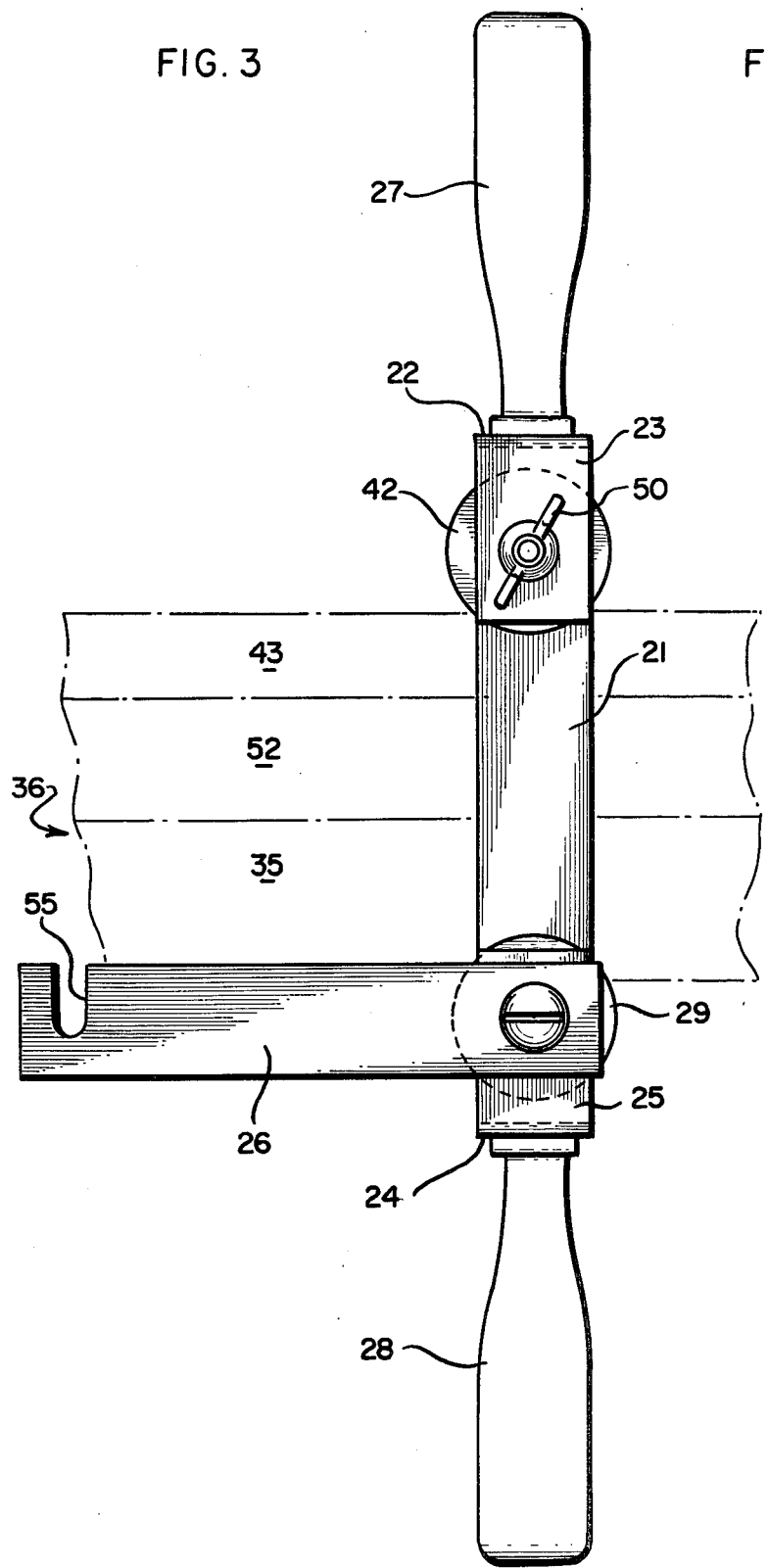
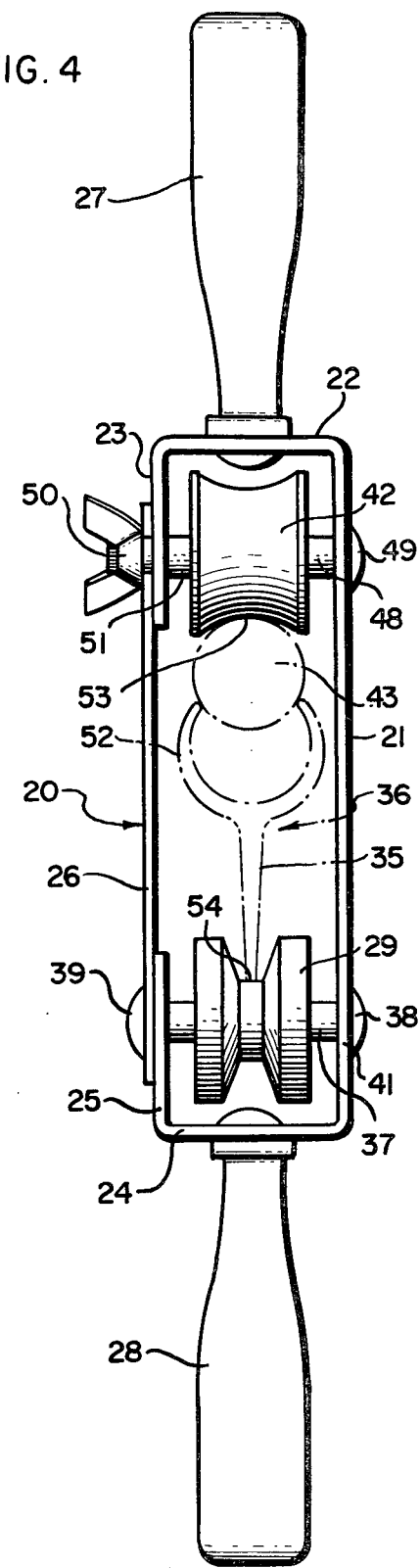

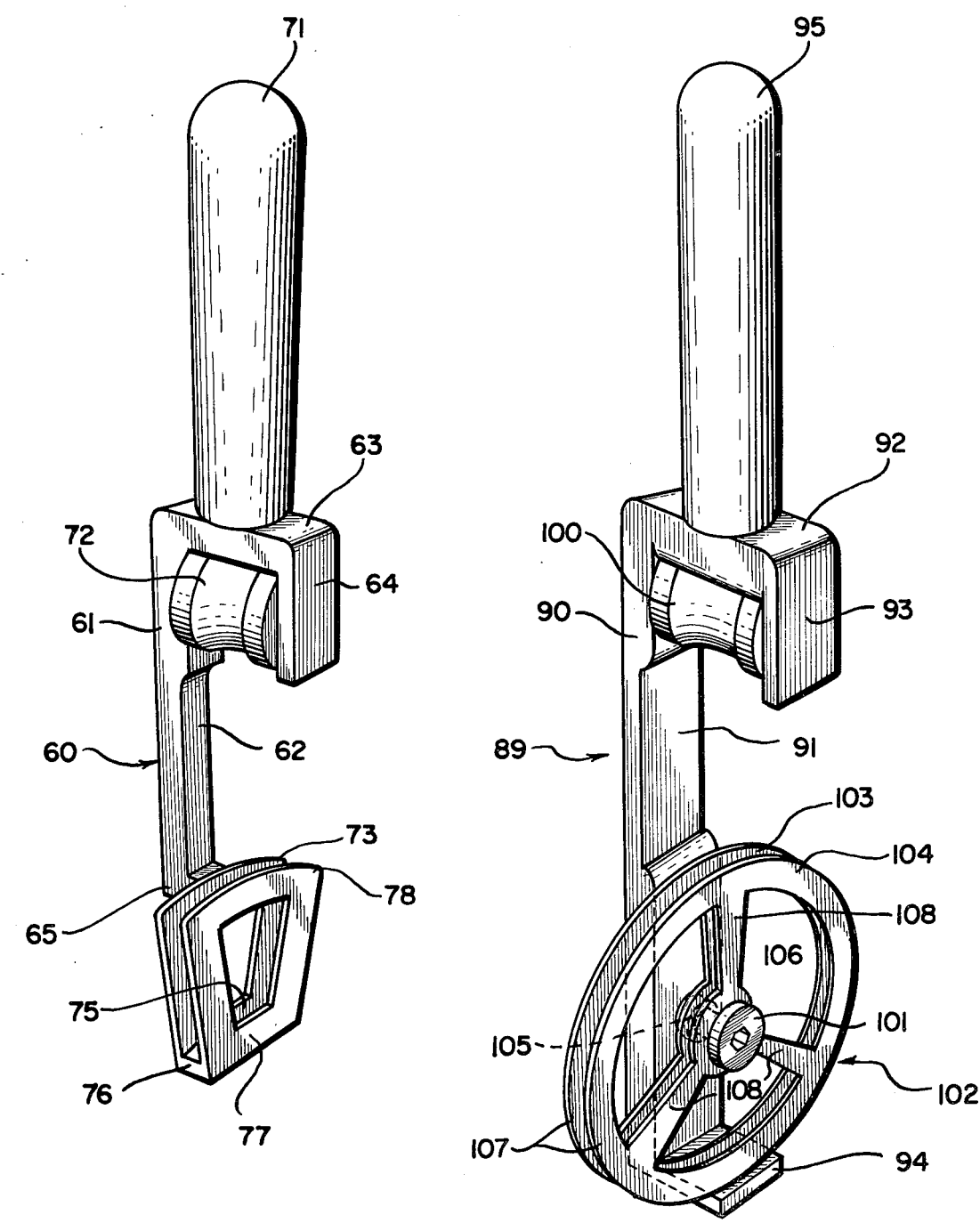

1

INSTALLATION TOOL

BACKGROUND OF THE INVENTION

The present invention relates generally to the protection of aerial power transmission lines, and more particularly, to a tool for installing vibration dampers on the lines to prevent galloping and consequent breakage of the lines.

Under certain weather conditions when aerial power transmission conductor lines become coated with ice and are exposed to wind, the phenomenon of galloping occurs. Galloping defines the low frequency, large amplitude natural vibration of the lines. The conductor lines can be seriously damaged and often broken by this weather-induced phenomenon.

One preventive solution to this problem is to attach to the conductors an aerodynamic aerial conductor vibration damper, an example of which is described in U.S. Pat. No. 3,992,566. A vibration damper reduces the amplitude of vibration of the conductors and thereby mitigates the galloping phenomenon.

The aerodynamic aerial conductor vibration damper in question comprises an elongated plate or fin depending from a plastic clamping member in the form of a split sleeve integral with the fin. The internal diameter of the split sleeve is less than the external diameter of the conductor, and the split sleeve is sufficiently resilient so that the split sleeve can be interference fitted onto the conductor, covering more than 180° of its circumference.

The damper is applied to the conductor with an installation tool. The problem which this invention addresses is the need to provide a tool which simply and quickly installs dampers on the aerial conductors suspended between supporting towers.

SUMMARY OF THE INVENTION

A vibration damper installation tool in accordance with the present invention comprises a frame capable of fitting around a suspended aerial conductor; a conductor guide for receiving and creating a moving fulcrum along the conductor; a fin receiver for receiving the fin of the damper; and structure on the conductor guide and fin receiver for urging the split sleeve clamping member of the damper onto the conductor in response to the application of a force to the tool.

The conductor guide and fin receiver are mounted on the frame in spaced-apart relation; and, when the frame is fitted around the conductor, the conductor guide, the conductor, the damper and the fin receiver can be mutually aligned. The fin receiver is sufficiently spaced from the conductor guide so that, when the frame is vertically disposed to the horizontal axis of the conductor, the conductor is in contact with the top of the split sleeve of the damper and the damper fin is received in the fin receiver. Once the tool, conductor and damper are thus engaged, there is applied to the tool a force having opposite vertical directional components at the conductor guide and at the fin receiver respectively. This can be readily produced by canting the tool so that the frame is at an angle non-perpendicular to the axis of the conductor.

When the tool is vertically disposed, the conductor guide and fin receiver are vertically aligned. At a canted tool disposition, the line between the conductor guide and the fin receiver has both vertical and horizontal components. As the tool is canted toward a predetermined angle to the conductor, the vertical component between the conductor guide and the fin receiver is decreased. This creates opposite vertical directional forces against the conductor and the split sleeve of the damper. The application of force as the tool is moved along the conductor creates a moving fulcrum on the top surface of the conductor, so that the tool operates as a sliding lever urging the sleeve securely onto the conductor.

When the damper is completely clamped to the conductor, the tool is returned from its canted to its vertical position. This disengages the clamped damper from the fin receiver.

Other features and advantages are inherent in the tool claimed and disclosed or will become apparent to those skilled in the art from the following detailed description in conjunction with the accompanying diagrammatic drawing.

BRIEF DESCRIPTION OF THE DRAWINGS

FIG. 1 is a perspective of a vibration damper installation tool in accordance with one embodiment of the present invention;

FIG. 2 is a perspective of the tool and a clamped conductor and damper;

Figure 8:
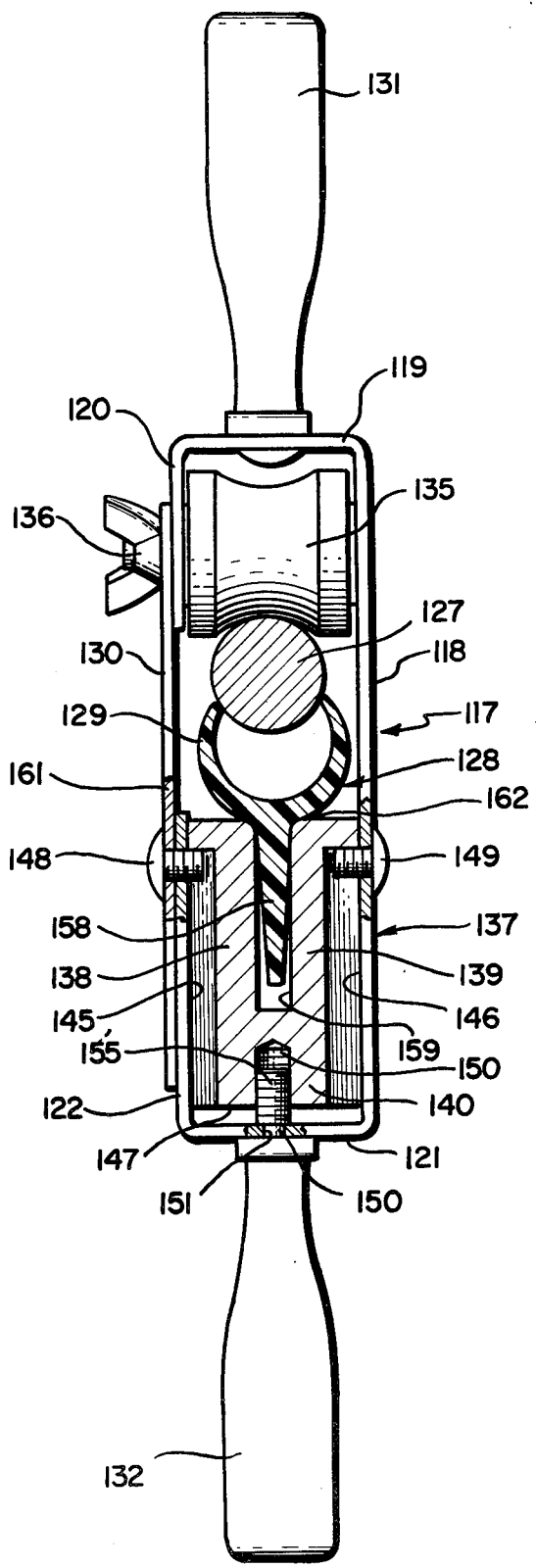
Figure 9:
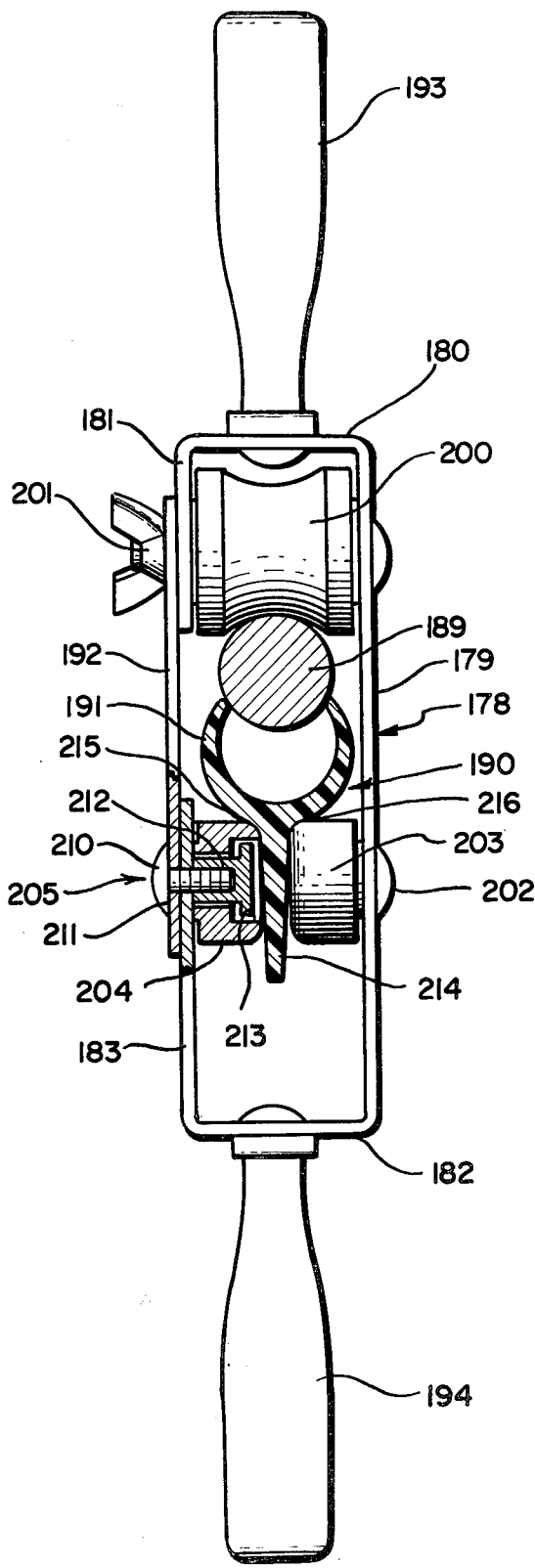

FIG.ther embodiment of the present invention;

FIG. 7 is a perspective of a vibration damper installation tool in accordance with a further embodiment of the present invention;

FIG. 8 is a front view, partially in section, of a vibration damper installation tool in accordance with still another embodiment of the present invention; and FIG. 9 is a front view, partially in section, of a vibration damper installation tool in accordance with yet a further embodiment of the present invention.

DETAILED DESCRIPTION

Referring initially to FIG. 1, indicated generally at 20 is the frame of an embodiment of a vibration damper installation tool in accordance with the present invention. Frame 20 is an incomplete rectangle formed by a relatively long, straight side element 21 from which extends a relatively short upper element 22 from which depends a relatively short downward flange 23 parallel to side element 21. Spaced from and parallel to upper element 22 is a relatively short lower element 24 which extends from side element 21. Extending from lower element 24 is a relatively short upward flange 25 parallel to side element 21. Referring to FIGS. 3-4, the space between downward flange 23 and upward flange 25 is large enough to receive an aerial conductor 43 plus a vibration damper indicated generally at 36 when the split sleeve 52 of damper 36 is in contact with conductor 43 but split sleeve 52 is not yet clamped around conductor 43. The rectangular shape of frame 20 is completed by a separate straight frame element 26 which overlaps both downward flange 23 and upward flange 25. Extending upwardly from upper element 22 is a handle 27, and extending downwardly from lower element 24 is a handle 28. This elongated rectangular frame functions as a lever arm when the tool is in operation.

Referring to FIGS. 2, 4 and 5, positioned between the lower end of side element 21 and upward flange 25, above lower short element 24, is a roller 29 with a grooved periphery which functions as a fin receiver to engage the fin portion 35 of vibration damper 36. Grooved roller 29 is rotatably mounted within frame 20 by a rivet 37 which extends along the axis of grooved roller 29. Rivet 37 has one end terminating at a rivet head 38 located on the outside of side element 21 and another end extending through upward flange 25 and separate frame element 26 to terminate at a screw head 39 located on the outside of separate frame element 26. A screw shank 40 extends from head 39 and threadedly engages within rivet 37. Rivet 37 is surrounded by a tubular element 41 which rotates around the shank of rivet 37. Element 41 extends along the axis of grooved roller 29 and mounts the latter for rotation about rivet 37. Separate frame element 26 is pivotally mounted on rivet 37 for movement between a closed position shown in FIGS. 1, 2, 4, and 5 and an open position shown in FIG. 3.

Positioned between side element 26 and downward flange 23, beneath upper element 22, is a roller 42 with a concave recessed periphery which functions as a conductor guide to engage conductor 43 and create a moving fulcrum along conductor 43. Concave roller 42 is rotatably mounted on a rivet 48 which extends along the axis of roller 42. Rivet 48 has one end terminating at a rivet head 49 located on the outside of side element 21 and an externally threaded other end which extends through downward flange 23 and separate frame element 26 for engagement with a butterfly nut 50. Rivet 48 is surrounded by a tubular element 51 which rotates around the shank of rivet 48. Element 51 extends along the axis of concave roller 42 to mount the latter for rotation about rivet 48.

Butterfly nut 50 turns to loosen it or tighten it relative to separate frame element 26. Separate frame element 26 contains a U-shaped groove 55 (FIG. 3) which fits around that portion of rivet 48 which extends through downward flange 23. When butterfly nut 50 is fastened tightly, it holds separate frame element 26 in place against downward flange 23. When butterfly nut 50 is loosened, it allows separate frame element 26 to be pivoted from its closed position (FIGS. 1-2, 4 and 5) to its open position (FIG. 3).

Referring now to FIGS. 3-4, initially when the tool is positioned on the conductor, it is vertically disposed perpendicularly to the horizontal axis of conductor 43. The unclamped conductor is in contact from above with concave roller 42, and in contact and aligned from below with the opening of split sleeve 52 of damper 36, and damper fin 35 is engaged by grooved roller 29. In this vertical disposition of the tool, the distance between the deepest point 53 of the recessed periphery of concave roller 42 and the deepest point 54 of the grooved periphery of grooved roller 29 has only a vertical component. This vertical component is larger than a predetermined vertical dimension consisting of (1) the depth of damper 36 plus (2) the dimension along its diameter of the unengaged portion of conductor 43.

Installation of the damper on the conductor is illustrated in FIGS. 2 and 5. The tool is canted, by the application of force in opposite directions on handles 27, 28, to a predetermined angle non-perpendicular to the horizontal axis of conductor 43, causing concave roller 42 to bear against the conductor 43 thereby providing a fulcrum for the lever arm of the frame 20, and this forces split sleeve 52 onto conductor 43. The top of conductor 43 and the bottom of damper fin 35 are engaged by concave roller 42 and grooved roller 29, respectively. In a canted tool disposition, the distance between concave roller 42 and grooved roller 29 has both horizontal and vertical components. The vertical component of this distance is less than the predetermined dimension described at the end of the last paragraph and less than the vertical distance between concave roller 42 and grooved roller 29 when the tool is vertically disposed perpendicularly to the horizontal axis of conductor 43 (FIGS. 1, 3 and 4). The decrease in the vertical component as the tool is canted toward the predetermined non-perpendicular angle and moved along the conductor creates opposite vertical directional forces against conductor 43 and damper 36 and a moving fulcrum on the top surface of conductor 43 sufficient to urge split sleeve 52 of damper 36 securely onto conductor 43. The recessed and grooved surfaces of concave roller 42, and grooved roller 29, respectively, enable the canted tool to slidably engage and clamp damper 36 onto any length of conductor 43 at said angle.

Referring to FIG. 6, there is illustrated another embodiment of a vibration damper installation tool according to the present invention. The embodiment of FIG. 6 has a frame, indicated generally at 60, in the shape of an incomplete rectangle formed by a long, straight side element 61, having a narrower portion 62 alongside where the damper sleeve and conductor will be located to more easily accommodate their diameters. An upper short element 63 extends transversely from the upper end of side element 61, and a flange 64 depends from element 63. Spaced apart from and parallel to upper short element 63, is a lower short element 65 which extends transversely from the lower end of side element 61 and connects the latter to a fin receiver indicated generally at 70. Extending upwardly from upper short element 63 is a handle 71.

Rotatably mounted in a conventional manner, between side element 45 and flange 48, beneath upper element 47, is a roller 72 with a concave recessed periphery which functions as a conductor guide. Fin receiver 70 depends from lower short element 65, and comprises a perforated substantially trapezoid-shaped plate 73 attached to lower frame element 65 at its larger upper parallel base 74. Plate 73 has a lower, smaller parallel base 75 integral with a narrow element 76 connected to a lower, smaller parallel base 77 of another perforated trapezoid-shaped plate 78. Fin receiver 70 forms a stationary groove into which the fin of the damper will fit when the tool is used.

FIG. 7 shows a further embodiment of a vibration damper installation tool according to the present invention. This embodiment has a frame, indicated generally at 89 and comprising a long straight side element 90, having a narrower portion 91 alongside where the damper sleeve and the conductor will be located, to more easily accommodate their diameters. Extending transversely from element 90 is a short, upper element 92 from which depends a flange 93. Spaced from and parallel to upper element 92, at the lower end of side element 90, is a short, lower element 94. Extending upwardly from upper element 92 is a handle 95.

Rotatably mounted, in a conventional manner, between side element 90 and flange 93 is a concave roller 100 which functions as a conductor guide. Spaced above lower short element 94 and extending from side element 90 is a bolt 101 which attaches a fin receiver, indicated generally at 102, to frame 89.

Fin receiver 102 comprises two large, perforated, circular discs 103, 104 each comprising a narrow circular, outer rim 107, 107 from which three narrow spokes 108, 108 extend inwardly to a small, circular inner hub 106 through which bolt 101 extends. Discs 103, 104 are spaced apart from each other on bolt 101 by a small tubular element 105 integral with hubs 106, 106. Both discs 103, 104 and tubular element 105 revolve around bolt 101, thus providing rotation to fin receiver 102.

Referring to FIG. 8, there is shown still another embodiment of a vibration damper installation tool according to the present invention. Indicated generally at 117, is a frame in the form of an incomplete rectangle comprising a long straight side element 118 integral with a transversely extending short upper element 119 from which depends a flange 120 parallel to side element 118. Spaced from and parallel to short upper element 119 is a short lower element 121 which extends from side element 118. Extending upwardly from lower element 121 is a flange 122 parallel to side element 118. The space between downward flange 120 and upward flange 122 is large enough to allow placement of the tool on an aerial conductor 127. The rectangular shape of frame 117 is completed by a separate straight element 130, which overlaps the two flanges 120 and 122 acting as a safety plate to secure the tool around the conductor 127. Extending upwardly from upper element 119 is a handle 131. Extending downwardly from lower element 121 is a handle 132.

Rotatably mounted between side element 118 and flange 120, beneath upper element 119, is a conductor guide or roller 135 with a concave recessed periphery engaging and creating a moving fulcrum along conductor 127. The structure for rotatably mounting concave roller 135 may be the same as that employed for rotatably mounting concave roller 42 in the embodiment of FIGS. 1–5.

Removably fastening straight element 130 to frame 117 at flange 120 is a fastener 136 which functions in the same manner as butterfly nut 50 in the embodiment of FIGS. 1–5. Straight element 130 is movable between open and closed positions in the manner of element 26 in the embodiment of FIGS. 1–5.

Positioned between side element 118 and upward flange 122 is a fin receiver indicated generally at 137 and mounted for movement towards or away from concave roller 135. The fin receiver has a U-shaped cross section formed by two parallel, spaced-apart arms 138, 139 extending perpendicularly from a base 140 located above the frame's lower element 121.

Within each parallel arm 138, 139 is a respective elongated slot 145, 146 extending upwardly from the bottom surface 147 of fin receiver 137. Extending through side element 118 into slot 146, is a screw 148, and extending through separate element 130 and flange 122 into slot 145 is a screw 149. Screws 148, 149 hold fin receiver 137 in place between side element 118 and flange 122, yet also mount the fin receiver for slidable movement towards and away from concave roller 135. Screw 149 also serves as a pivot pin for straight element 130.

Base 140 of fin receiver 137 has a threaded hole 150 for receiving a screw 155. This screw has a lower extension 156 embedded in lower frame handle 132 and extending upwardly therefrom through an opening 157 in lower frame element 121 to mount handle 132 for rotation relative to frame 117. The threaded portion of screw 155 has a diameter larger than extension 156 and overlies and rests upon lower frame element 121 around opening 157 therein.

Lower handle 132 may be rotated in one sense, with screw 155, to cause the screw to interact with the threads in hole 150 to urge fin receiver 137 to move upwardly towards concave roller 135. Lower handle 132 may be rotated in an opposite sense to urge the fin receiver to move downwardly towards lower frame element 121. This movement allows the fin receiver to accommodate different sizes of conductor 127 and damper 128.

Fin receiver arms 138, 139 define a slot 159 therebetween. When the fin 158 of damper 128 is inserted into slot 159, the portions of the damper sleeve 129 immediately adjacent each side of fin 158, are engaged by portions of arms 138, 139 at 161, 162.

FIG. 9 illustrates yet a further embodiment of a vibration damper installation tool in accordance with the present invention. In this embodiment, the frame is indicated generally at 178 and comprises an incomplete rectangle formed by a long straight side element 179 integral with a short, upper element 180 from which depends a downward flange 181 parallel to side element 179. Spaced from and parallel to upper element 180 is a short, lower element 182 integral with side element 179. Extending upwardly from lower element 182 is a flange 183 parallel to side element 179. The space between downward flange 181 and upward flange 183 is large enough to receive an aerial conductor 189 plus the depth of the damper 190 when the split sleeve 191 of damper 190 is in contact with conductor 189 but split sleeve 191 is not yet clamped around conductor 189. The rectangular shape of frame 178 is completed by a separate straight element 192 which overlaps the two flanges 181 and 183. Extending upwardly from upper element 180 is a handle 193 and extending downwardly from lower element 182 is a handle 194.

Rotatably mounted between side element 179 and flange 181, beneath upper element 180, is a conductor guide or roller 200 with a concave recessed periphery for engaging and creating a moving fulcrum along conductor 189. The structure for rotatably mounting concave roller 200 may be the same as that used for mounting roller 42 in the embodiment of FIGS. 1–5. Removably fastening straight element 192 to frame 178 at flange 181 is a fastener 201 which functions in the manner of butterfly nut 50 in the embodiment of FIGS. 1–5. Straight element 192 is movable between open and closed positions in the manner of element 26 in the embodiment of FIGS. 1–5.

The fin receiver of this embodiment, indicated generally at 202, comprises two spaced apart, rotatable elements 203, 204 respectively located on side element 179 and frame flange 183. Rotatable element 204 is mounted on flange 183 by a fastener 205 having a head 210 positioned on the outside of separate frame element 192 and a threaded shank 211 which extends through separate frame element 192 and upward flange 183 into fin receiver element 204. Shank 211 is secured by a T-shaped nut 212 located within a T-shaped interior space 213 in element 204 which rotates about nut 212. Rotatable element 203 is mounted for rotation in the same manner as element 204. Fastener shank 211 also serves as a pivot pin for movement of separate frame element 192 between open and closed positions in the manner of element 26 in the embodiment of FIGS. 1–5.

When the fin 214 of damper 190 is inserted between rotatable elements 203 and 204, the portions of damper sleeve 191 immediately adjacent each side of fin 214 are engaged by portions of rotatable elements 203, 204 at 215, 216.

When this embodiment is vertically disposed perpendicularly to the horizontal axis of conductor 189, the distance between the deepest point of the recessed periphery of concave roller 200 and portions of rotatable elements 203, 204 which engage damper sleeve 191 at 215, 216 has only a vertical component. This vertical component may be equal to or larger than a predetermined vertical dimension consisting of (1) the diameter of the conductor and (2) the dimension of the thickest portion of the split sleeve of the damper.

What is claimed is:

1. A tool for attaching a vibration damper to an aerial conductor, said damper having a predetermined depth and comprising an elongated fin extending from a contiguous clamping member in the form of a split sleeve having an inside diameter less than the outside diameter of the conductor and defining an arc of at least 180 degrees and having an opening, said tool comprising:

frame means providing a lever arm;
   conductor engaging means on said frame means for receiving said conductor and aligning the transverse axis of the conductor with the transverse axis of the split sleeve of the damper;
   said conductor engaging means comprising means for applying a force to the outer surface of said conductor to provide a fulcrum for said lever arm of said frame means;
   fin receiving means on said frame means, spaced from said conductor engaging means, for receiving said damper fins and aligning the transverse axis of said sleeve of the damper with the transverse axis of the conductor;
   said fin receiving means comprising means for applying a force in the direction of said conductor; and
   means including said fin receiving means and said conductor engaging means, for urging said split sleeve clamping member onto said conductor in response to said application of force.

2. A tool as recited in claim 1 wherein said frame means has a rectangular shape and comprises:
   a first frame portion defining part of a rectangle having a space in one side thereof;
   said space having a size large enough to receive said conductor;
   a second frame portion comprising means for closing said space;
   means mounting said second frame portion on said first frame portion for movement of the former in relation to the latter between a first position in which said second frame portion closes said space and a second position in which said space is unclosed; and
   means for securing said second frame portion in its first position.

3. A tool as recited in claim 1 and comprising:
   at least one handle attached to said frame means.

4. A tool as recited in claim 1 wherein said fin receiving means comprises:
   grooved means for receiving the fin of said damper.

5. A tool as recited in claim 4 wherein said fin receiving means comprises:
   an element having a periphery;
   means mounting said element for rotation about an axis transverse to the axis of said conductor;
   said grooved means being located around said periphery of said element.

6. A tool as recited in claim 4 and comprising:
   means mounting said fin receiving means immovably on said frame means.

7. A tool as recited in claim 1 wherein said conductor engaging means comprises:
   recessed means for receiving said conductor.

8. A tool as recited in claim 7 and comprising:
   means mounting said conductor engaging means immovably on said frame means.

9. A tool as recited in claim 7 wherein said conductor engaging means comprises:
   an element having a periphery;
   means mounting said element for rotation about an axis transverse to the axis of said conductor;
   said recessed means being located around said periphery of said element.

10. A tool as recited in claim 9 wherein said fin receiving means comprises:
    an element having a periphery;
    means mounting said element for rotation about an axis transverse to the axis of said conductor;
    grooved means for receiving the fin of said damper;
    said grooved means being located around said periphery of said element.

11. A tool as recited in claim 10 wherein said frame means has a rectangular shape and comprises:
    a first frame portion defining part of a rectangle having a space in one side thereof;
    said space having a size large enough to receive said conductor;
    a second frame portion comprising means for closing said space;
    means mounting said second frame portion on said first frame portion for movement of the former in relation to the latter between a first position in which said second frame portion closes said space and a second position is which said space is unclosed; and
    means for securing said second frame portion in its first position.

12. A tool as recited in claim 1 wherein the depth of said damper plus the dimension along its diameter of the unengaged portion of said conductor constitutes a first predetermined dimension and wherein:
    the distance between said conductor engaging means and said fin receiving means is greater than said first predetermined dimension when said tool is disposed perpendicularly to the axis of said conductor;
    the distance between said conductor engaging means and said fin receiving means has a component parallel to the axis of said conductor and a component perpendicular to the axis of said conductor when said tool is canted at a non-perpendicular angle to the axis of said conductor; and
    the dimension of said perpendicular component is less than said first predetermined dimension when said tool is canted at a said non-perpendicular angle.

13. A tool as recited in claim 12 wherein:
    said fin receiving means is a grooved means;
    said conductor engaging means is a recessed means; and
    said distance between said conductor engaging means and said fin receiving means constitutes the distance from the deepest point of the groove of said fin receiving means to the deepest point of the recess of said conductor engaging means.

14. A tool as recited in claim 13 wherein:
    said means for urging said split sleeve clamping member onto said conductor in response to the application of force comprises means responsive to the canting of said tool towards a predetermined non-perpendicular angle.

15. A tool as recited in claim 12 wherein:
said fin receiving means comprises means for slidably engaging the fin of the damper when the tool is canted towards said predetermined non-perpendicular angle; and
said conductor engaging means comprises means for slidably engaging the conductor when the tool is canted towards said predetermined non-perpendicular angle and creating a moving fulcrum along the top surface of said conductor.

16. A tool as recited in claim 1 wherein said fin receiving means comprises:
a pair of means each for engaging a respective portion of said clamping member adjacent said fin and on a respective opposite side thereof;
means mounting said fin receiving means for movement, in a direction having at least a component perpendicular to the axis of said conductor, towards and away from said conductor engaging means; and
means for imparting said movement to said fin receiving means.

17. A tool as recited in claim 1 wherein said fin receiving means comprises:
two elements;
said elements being spaced apart from each other for allowing the fin of the damper to fit between them;
means mounting each element for rotation about an axis transverse to the axis of said conductor; and
means on each element for engaging a portion of said clamping member adjacent said fin.

18. A tool as recited in claim 16 wherein the distance between said conductor engaging means and said fin receiving means is the dimension of the thickest portion of the split sleeve of said damper and the diameter of said conductor.

19. A tool as recited in claim 17 wherein the distance between said conductor engaging means and said fin receiving means is the dimension of the thickest portion of the split sleeve of said damper and the diameter of said conductor.

* * * * *